(12) United States Patent
Gravina

(10) Patent No.: US 10,890,247 B2
(45) Date of Patent: Jan. 12, 2021

(54) LUBRICATION FLUID COLLECTION IN A GEARBOX OF A GAS TURBINE ENGINE

(71) Applicant: GE AVIO S.R.L, Rivalta di Torino (IT)

(72) Inventor: Michele Gravina, Barletta-Andria-Trani (IT)

(73) Assignee: GE AVIO S.R.L, Rivalta di Torino (IT)

( * ) Notice: Subject to any disclaimer, the term of this patent is extended or adjusted under 35 U.S.C. 154(b) by 411 days.

(21) Appl. No.: 16/163,985

(22) Filed: Oct. 18, 2018

(65) Prior Publication Data
US 2019/0113127 A1   Apr. 18, 2019

(51) Int. Cl.
*F16H 57/04* (2010.01)
*F02C 7/36* (2006.01)
*F01D 25/18* (2006.01)
*F16H 1/28* (2006.01)
(Continued)

(52) U.S. Cl.
CPC .......... *F16H 57/045* (2013.01); *F01D 25/18* (2013.01); *F02C 7/06* (2013.01); *F02C 7/36* (2013.01); *F02K 3/06* (2013.01); *F16H 1/28* (2013.01); *F16H 57/0427* (2013.01); *F16H 57/0456* (2013.01); *F16H 57/0482* (2013.01); *F16H 57/0486* (2013.01); *F05D 2240/12* (2013.01); *F05D 2240/70* (2013.01); *F05D 2260/40311* (2013.01); *F05D 2260/602* (2013.01); *F05D 2260/98* (2013.01)

(58) Field of Classification Search
CPC ............. F16H 57/0427; F02D 2260/98; F02D 2260/40311
See application file for complete search history.

(56) References Cited

U.S. PATENT DOCUMENTS

| 2,795,155 | A | * | 6/1957 | Bade ......................... F16H 1/32 475/177 |
| 3,074,688 | A | * | 1/1963 | Demuth .................. F16N 7/363 415/175 |
| 3,160,026 | A |   | 12/1964 | Rosen |

(Continued)

FOREIGN PATENT DOCUMENTS

| EP | 2518296 A2 | 10/2012 |
| EP | 2559914 A1 | 2/2013 |

(Continued)

OTHER PUBLICATIONS

EP Search Report and Written Opinion dated Apr. 9, 2018 which was issued in connection with EP patent application No. 17425102.5 which was filed on Oct. 18, 2017.

(Continued)

*Primary Examiner* — Sherry L Estremsky
(74) *Attorney, Agent, or Firm* — Dority & Manning, PA

(57) ABSTRACT

An epicyclic gearbox assembly for a gas turbine engine includes a sun gear assembly; a planet gear assembly engaged with the sun gear assembly; and a ring gear assembly including one or more ring gears engaged with the planet gear assembly. The epicyclic gearbox assembly further includes a lubrication fluid collection assembly having a rotating oil scoop extending in a circumferential direction around the ring gear assembly, the rotating oil scoop coupled to the ring gear assembly at a location forward of one or more ring gears of the ring gear assembly.

20 Claims, 4 Drawing Sheets

(51) Int. Cl.
*F02K 3/06* (2006.01)
*F02C 7/06* (2006.01)

(56) References Cited

U.S. PATENT DOCUMENTS

| | | | |
|---|---|---|---|
| 3,477,547 A * | 11/1969 | Kress | B60R 17/00 |
| | | | 184/63 |
| 3,502,177 A | 3/1970 | Christie | |
| 4,429,587 A | 2/1984 | Finn, III et al. | |
| 5,643,129 A * | 7/1997 | Richardson | B60K 23/08 |
| | | | 180/248 |
| 6,223,616 B1 | 5/2001 | Sheridan | |
| 6,446,755 B1 | 9/2002 | Varailhon et al. | |
| 6,666,300 B2 | 12/2003 | Varailhon et al. | |
| 6,996,968 B2 | 2/2006 | Peters et al. | |
| 8,753,243 B2 | 6/2014 | McCune et al. | |
| 8,820,478 B2 | 9/2014 | Gauthier et al. | |
| 8,900,090 B2 | 12/2014 | Sheridan | |
| 8,939,714 B1 | 1/2015 | McCune et al. | |
| 9,404,381 B2 | 8/2016 | NguyenLoc et al. | |
| 9,810,312 B2 * | 11/2017 | Obayashi | F16H 57/0427 |
| 10,280,795 B2 * | 5/2019 | Lao | F02C 7/36 |
| 2008/0006018 A1 * | 1/2008 | Sheridan | F16H 57/0479 |
| | | | 60/39.1 |
| 2010/0317477 A1 | 12/2010 | Sheridan et al. | |
| 2013/0023378 A1 | 1/2013 | McCune et al. | |
| 2014/0064930 A1 | 3/2014 | Sheridan et al. | |
| 2014/0309078 A1 | 10/2014 | Curti et al. | |
| 2015/0345321 A1 | 12/2015 | McCune et al. | |
| 2016/0377165 A1 | 12/2016 | Sheridan | |
| 2017/0254407 A1 | 9/2017 | Cipolla et al. | |
| 2019/0264800 A1 * | 8/2019 | Fisher | F16H 57/0424 |

FOREIGN PATENT DOCUMENTS

| | | |
|---|---|---|
| EP | 2518296 A2 | 4/2018 |
| WO | 2014099087 A2 | 6/2014 |
| WO | 2014099087 A3 | 6/2014 |
| WO | 2014152347 A2 | 9/2014 |
| WO | 2014152347 A3 | 9/2014 |
| WO | 2015147948 A2 | 10/2015 |
| WO | 2015147948 A3 | 10/2015 |
| WO | 2017022213 A1 | 2/2017 |
| WO | 2017022214 A1 | 2/2017 |

OTHER PUBLICATIONS

EP Search Report and Written Opinion dated Apr. 23, 2018 which was issued in connection with EP patent application No. 17425101.7 which was filed on Oct. 18, 2017.

* cited by examiner

LUBRICATION FLUID COLLECTION IN A GEARBOX OF A GAS TURBINE ENGINE

FIELD

The present subject matter relates generally to a gearbox for a gas turbine engine, or more particularly, a gearbox for a gas turbine engine having a lubrication fluid collection assembly.

BACKGROUND

A gas turbine engine generally includes a fan and a core arranged in flow communication with one another with the core disposed downstream of the fan in the direction of the flow through the gas turbine. The core of the gas turbine engine generally includes, in serial flow order, a compressor section, a combustion section, a turbine section, and an exhaust section. With multi-shaft gas turbine engines, the compressor section can include a high pressure compressor (HP compressor) disposed downstream of a low pressure compressor (LP compressor), and the turbine section can similarly include a low pressure turbine (LP turbine) disposed downstream of a high pressure turbine (HP turbine). With such a configuration, the HP compressor is coupled with the HP turbine via a high pressure shaft (HP shaft), and the LP compressor is coupled with the LP turbine via a low pressure shaft (LP shaft).

In operation, at least a portion of air over the fan is provided to an inlet of the core. Such portion of the air is progressively compressed by the LP compressor and then by the HP compressor until the compressed air reaches the combustion section. Fuel is mixed with the compressed air and burned within the combustion section to provide combustion gases. The combustion gases are routed from the combustion section through the HP turbine and then through the LP turbine. The flow of combustion gasses through the turbine section drives the HP turbine and the LP turbine, each of which in turn drives a respective one of the HP compressor and the LP compressor via the HP shaft and the LP shaft. The combustion gases are then routed through the exhaust section, e.g., to atmosphere.

The LP turbine drives the LP shaft, which drives the LP compressor. In addition to driving the LP compressor, the LP shaft can drive the fan through a power gearbox, which allows the fan to be rotated at fewer revolutions per unit of time than the rotational speed of the LP shaft for greater efficiency. The power gearbox typically includes a sun gear, one or more planet gears, and a ring gear. Lubrication fluid is provided to one or more of these gears and associated bearings during operation to cool down the gearbox, to increase its efficiency and to reduce wear. The lubrication fluid is typically collected within an inner casing of the gearbox and centrifuged out through openings defined between, e.g., a triple or quadruple flange assembly (i.e., a bolted joint) axially aligned with and positioned radially outward of the ring gear of the gearbox.

However, such a configuration may result in a relatively large radial footprint being required to collect the lubrication fluid, with consequent higher weight. Additionally, such a configuration requires precise engineering in the design of the bolted joint to avoid fretting at each discontinuous mating surface of the several coupled components. Accordingly, an improved configuration for collecting lubrication fluid within a gearbox of a gas turbine engine would be useful.

BRIEF DESCRIPTION

Aspects and advantages of the invention will be set forth in part in the following description, or may be apparent from the description, or may be learned through practice of the invention.

In one exemplary embodiment of the present disclosure, an epicyclic gearbox assembly for a gas turbine engine is provided. The epicyclic gearbox assembly defines an axial direction, a radial direction, a circumferential direction, a forward end, and an aft end. The epicyclic gearbox assembly includes a sun gear assembly; a planet gear assembly engaged with the sun gear assembly; and a ring gear assembly including one or more ring gears engaged with the planet gear assembly. The epicyclic gearbox assembly further includes a lubrication fluid collection assembly including a rotating oil scoop extending in the circumferential direction around the ring gear assembly, the rotating oil scoop coupled to the ring gear assembly at a location forward of one or more ring gears of the ring gear assembly.

In certain exemplary embodiments the ring gear assembly further includes a ring gear shaft, wherein the rotating oil scoop is coupled to the ring gear shaft at a location forward of the one or more ring gears.

For example, in certain exemplary embodiments the rotating oil scoop extends from a location forward of the one or more ring gears to a location aft of the one or more ring gears.

For example, in certain exemplary embodiments the rotating oil scoop is coupled to the ring gear shaft at a joint, wherein the ring gear shaft defines a plurality of lubrication fluid openings spaced along the circumferential direction and positioned aft of the joint along the axial direction.

The epicyclic gearbox assembly of claim 4, wherein the plurality of lubrication fluid openings defined by the ring gear shaft are positioned forward of the one or more ring gears along the axial direction.

For example, in certain exemplary embodiments the rotating oil scoop is supported substantially completely at the joint.

In certain exemplary embodiments the lubrication fluid collection assembly further includes a static oil collector positioned at least partially outward of the rotating oil scoop along the radial direction.

For example, in certain exemplary embodiments the rotating oil scoop defines a plurality of lubrication fluid exits spaced along the circumferential direction, wherein the static oil collector defines an inlet, and wherein the inlet of the static oil collector is positioned outward of at least one of the lubrication fluid exits of the rotating oil scoop along the radial direction and aligned with at least one of the lubrication fluid exits of the rotating oil scoop along the axial direction.

For example, in certain exemplary embodiments the inlet of the static oil collector is a substantially continuous inlet along the circumferential direction.

For example, in certain exemplary embodiments the static oil collector defines an inlet for receiving lubrication fluid from the rotating oil scoop and a collection chamber for receiving lubrication fluid from the inlet, wherein the collection chamber extends substantially continuously along the circumferential direction.

For example, in certain exemplary embodiments the static oil collector includes an exit tube fluidly connected to the collection chamber.

For example, in certain exemplary embodiments the epicyclic gearbox assembly may further include a planet gear carrier, wherein the planet gear assembly is coupled to the planet gear carrier, and wherein the static oil collector is also coupled to the planet gear carrier.

For example, in certain exemplary embodiments the static oil collector is supported substantially completely by the planet gear carrier.

For example, in certain exemplary embodiments the static oil collector defines an overall length along the axial direction and a local height along the radial direction, wherein the overall length of the static oil collector is greater than the local height of the static oil collector.

In certain exemplary embodiments the planet gear assembly includes one or more planet gears, and wherein the epicyclic gearbox assembly further includes a forward lubrication fluid shroud positioned forward of the one or more planet gears of the planet gear assembly for containing lubrication fluid; and an aft lubrication fluid shroud positioned aft of the one or more planet gears of the planet gear assembly for containing lubrication fluid.

For example, in certain exemplary embodiments the forward lubrication fluid shroud defines an inside surface facing the one or more planet gears, wherein the aft lubrication fluid shroud defines an inside surface facing the one or more planet gears, wherein the rotating oil scoop extends from a location forward of the inside surface of the forward lubrication fluid shroud to a location aft of the inside surface of the aft lubrication fluid shroud.

In certain exemplary embodiments the rotating oil scoop extends substantially continuously from a forward end to an aft end.

In another exemplary embodiment of the present disclosure, a gas turbine engine is provided defining an axial direction, a radial direction, and a circumferential direction. The gas turbine engine includes a turbine section including a turbine; a fan assembly including a fan; and an epicyclic gearbox assembly coupling the turbine of the turbine section to the fan of the fan assembly. The epicyclic gearbox defines a forward end and an aft end and includes a sun gear assembly; a planet gear assembly engaged with the sun gear assembly; and a ring gear assembly including one or more ring gears engaged with the planet gear assembly. The epicyclic gearbox assembly further includes a lubrication fluid collection assembly including a rotating oil scoop extending in the circumferential direction around the ring gear assembly, the rotating oil scoop coupled to the ring gear assembly at a location forward of one or more ring gears of the ring gear assembly.

In certain exemplary embodiments the ring gear assembly further includes a ring gear shaft, wherein the rotating oil scoop is coupled to the ring gear shaft at a location forward of the one or more ring gears.

For example, in certain exemplary embodiments the rotating oil scoop is coupled to the ring gear shaft at a joint, wherein the ring gear shaft defines a plurality of lubrication fluid openings spaced along the circumferential direction and positioned aft of the joint along the axial direction, and wherein the rotating oil scoop is supported substantially completely at the joint.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
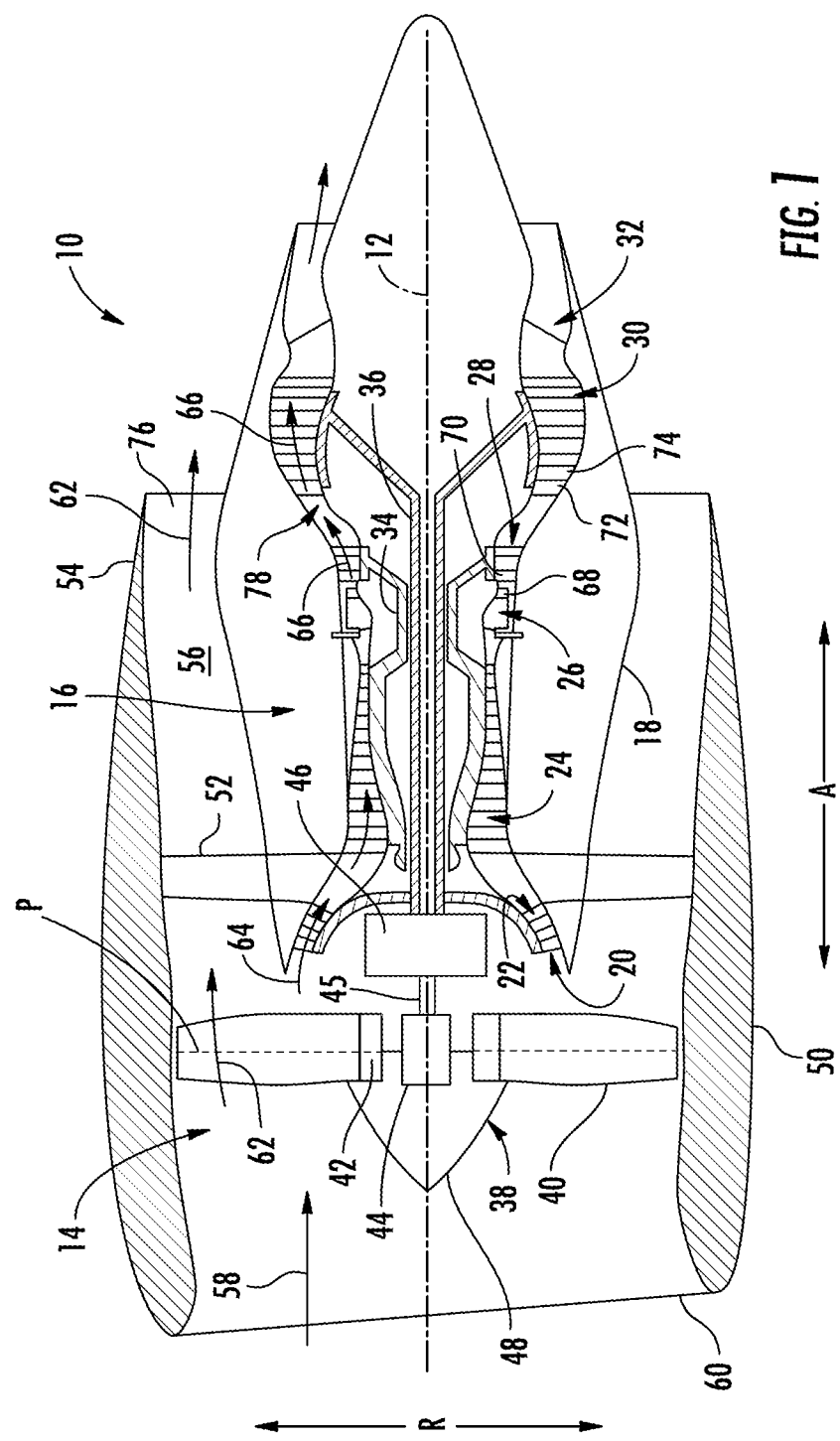
FIG. 1 is a schematic, cross-sectional view of an exemplary gas turbine engine according to various embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or a component of a gas turbine engine, and refer to the normal operational attitude of the gas turbine engine or component. For example, with regard to a gas turbine engine, forward refers to a position closer to an engine inlet and aft refers to a position closer to an engine nozzle or exhaust.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, wherein identical numerals indicate the same elements throughout the drawings, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R that is normal to the axial direction A. In general, the turbofan engine 10 includes a fan section 14 and a core turbine engine 16 disposed downstream from the fan section 14.

The exemplary core turbine engine 16 depicted generally includes a substantially tubular outer casing 18 that defines an annular inlet 20. As schematically shown in FIG. 1, the outer casing 18 encases, in serial flow relationship, a compressor section including a booster or low pressure (LP) compressor 22 followed downstream by a high pressure (HP) compressor 24; a combustion section 26; a turbine section including a high pressure (HP) turbine 28 followed downstream by a low pressure (LP) turbine 30; and a jet exhaust nozzle section 32. A high pressure (HP) shaft or spool 34 drivingly connects the HP turbine 28 to the HP compressor 24 to rotate them in unison. A low pressure (LP) shaft or spool 36 drivingly connects the LP turbine 30 to the LP compressor 22 to rotate them in unison. The compressor section, combustion section 26, turbine section, and nozzle section 32 together define a core air flowpath.

For the embodiment depicted in FIG. 1, the fan section 14 includes a variable pitch fan 38 having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 via a fan shaft 45 that is powered by the LP shaft 36 across a power gear box 46. The power gear box 46 includes a plurality of gears for adjusting the rotational speed of the fan shaft 45 and thus the fan 38 relative to the LP shaft 36 to a more efficient rotational fan speed.

Referring still to the exemplary embodiment of FIG. 1, the disk 42 is covered by a rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 is supported relative to the core turbine engine 16 by a plurality of circumferentially-spaced outlet guide vanes 52. Moreover, a downstream section 54 of the nacelle 50 extends over an outer portion of the core turbine engine 16 so as to define a bypass airflow passage 56 therebetween.

During operation of the turbofan engine 10, a volume of air 58 enters the turbofan engine 10 through an associated inlet 60 of the nacelle 50 and/or fan section 14. As the volume of air 58 passes across the fan blades 40, a first portion of the air 58 as indicated by arrow 62 is directed or routed into the bypass airflow passage 56, and a second portion of the air 58 as indicated by arrow 64 is directed or routed into the upstream section of the core air flowpath, or more specifically into the inlet 20 of the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where the highly pressurized air is mixed with fuel and burned to provide combustion gases 66.

The combustion gases 66 are routed into and expand through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed into and expand through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and rotation of the fan 38 via the power gearbox 46.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan engine 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, the fan 38 may be configured in any other suitable manner (e.g., as a fixed pitch fan) and further may be supported using any other suitable fan frame configuration. Moreover, it also should be appreciated that in other exemplary embodiments, any other suitable number or configuration of compressors, turbines, shafts, or a combination thereof may be provided. It also should be appreciated, that in still other exemplary embodiments, aspects of the present disclosure may be incorporated into any other suitable gas turbine engine. For example, in other exemplary embodiments, aspects of the present disclosure may be incorporated into, e.g., a turboshaft engine, turboprop engine, turbocore engine, turbojet engine, etc.

Figure 2:
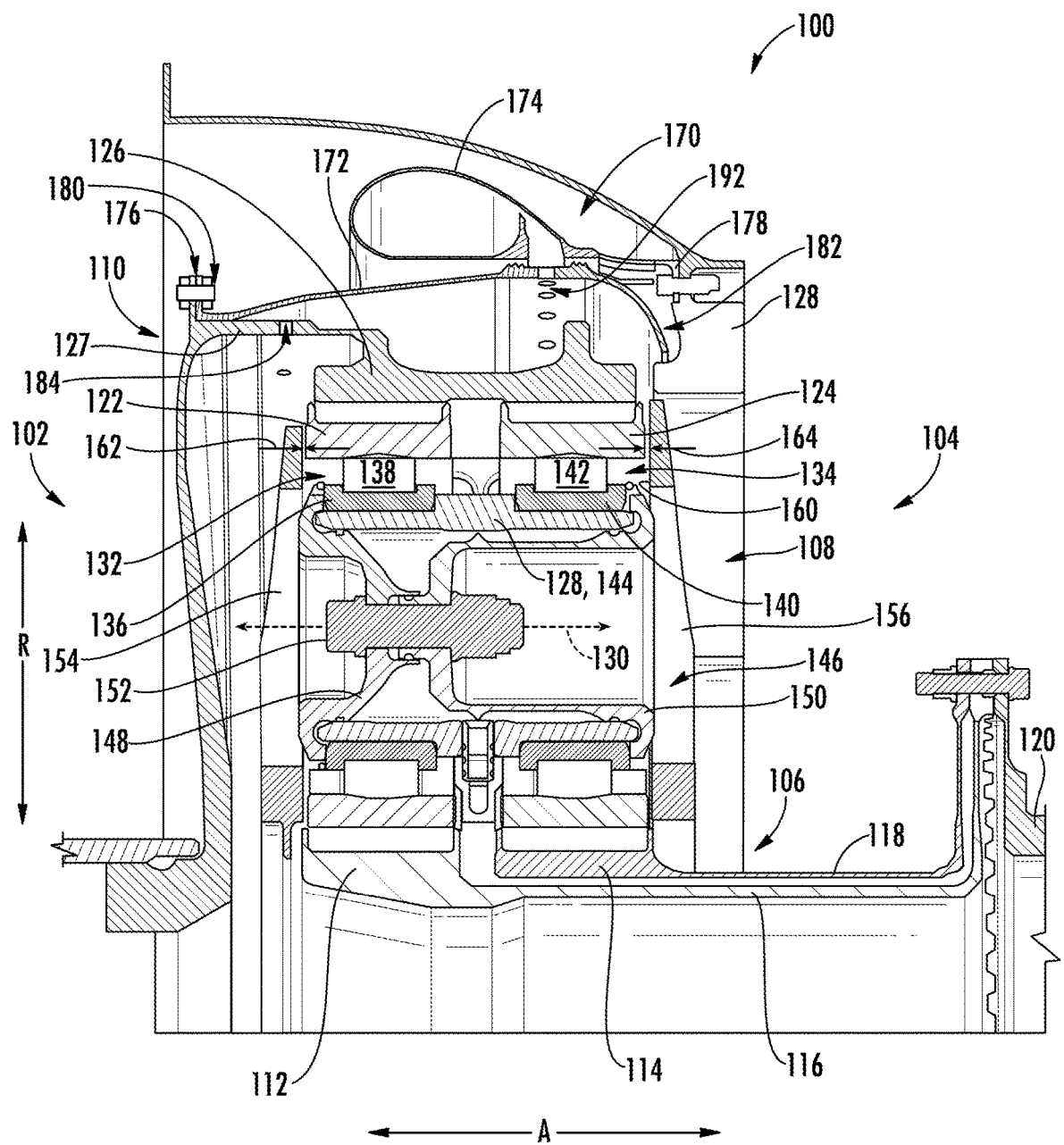
FIG. 2 is a cross-sectional view of a gearbox in accordance with an exemplary embodiment of the present disclosure.

Referring now to FIG. 2, a close-up, cross-sectional view is provided of an epicyclic gearbox assembly 100 in accordance with an exemplary embodiment of the present disclosure. The epicyclic gearbox assembly 100 generally defines an axial direction A, a radial direction R, and a circumferential direction C (see FIG. 4), as well as a forward side 102 and an aft side 104. In at least certain exemplary embodiments, the power gearbox 46 described above with reference to FIG. 1 may be configured in substantially the same manner as the exemplary epicyclic gearbox assembly 100 depicted in FIG. 2, and described below. Accordingly, in such an exemplary embodiment, the axial, radial, and circumferential directions A, R, C of the epicyclic gearbox assembly 100 may correspond with an axial direction A, radial direction R, and circumferential direction of the gas turbine engine within which it is installed (see, e.g., FIG. 1).

As is depicted, the epicyclic gearbox assembly 100 generally includes a sun gear assembly 106, a planet gear assembly 108, and a ring gear assembly 110. The sun gear assembly 106 generally includes a forward sun gear 112 and an aft sun gear 114 spaced along the axial direction A. The forward sun gear 112 is coupled to a forward sun gear shaft 116 and the aft sun gear 114 is similarly coupled to and aft sun gear shaft 118. The forward sun gear shaft 116 and aft sun gear shaft 118 are together coupled to an input shaft 120, which may be, e.g., a low pressure shaft (e.g., LP shaft 36, see FIG. 1) of the gas turbine engine including the epicyclic gearbox assembly 100.

The planet gear assembly 108 similarly includes a forward planet gear 122 and an aft planet gear 124 spaced along the axial direction A. The forward planet gear 122 and aft planet gear 124 are each engaged with the sun gear assembly 106. More specifically, for the embodiment depicted, the forward planet gear 122 is engaged with the forward sun gear 112 and the aft planet gear 124 is engaged with the aft sun gear 114. Notably, as will be appreciated, the forward planet gear 122 labeled in FIG. 2 is a first forward planet gear 122 of a plurality of forward planet gears 122 and the aft planet gear 124 labeled in FIG. 2 is a first aft planet gear 124 of a plurality of aft planet gears 124. (More particularly, as will be depicted in, e.g., FIG. 4, described below, for the embodiment shown, the plurality of forward planet gears 122 includes five forward planet gears 122, and as will be appreciated, the plurality of aft planet gears 124 includes five aft planet gears 124. However, in other embodiments, the plurality of forward planet gears 122 and plurality of aft planet gears 124 may instead have any other suitable number of planet gears.)

Further, it will be appreciated, that as used herein, the term "engaged," with respect to two or more gears, refers to, e.g., one or more teeth of such gears engaging with one another such that the two gears rotate with each other. Accordingly, although one or more gears may be represented schematically in the Figs. as smooth circles for clarity, it will be appreciated that such gears actually include a plurality of teeth arranged along their circumference for engaging with an adjacent gear(s).

Referring still to FIG. 2, the ring gear assembly 110 includes one or more ring gears. However, in contrast to the sun gear assembly 106 and planet gear assembly 108, the one or more ring gears of the ring gear assembly 110 is a single ring gear 126. The ring gear 126 is engaged with the planet gear assembly 108, and more specifically, is engaged with both the forward planet gear 122 and the aft planet gear 124. The ring gear 126 is coupled to a ring gear shaft 127. The ring gear shaft 127 is, in turn, coupled to an output shaft, which may be, e.g., a fan shaft of the gas turbine engine including the epicyclic gearbox assembly 100 (e.g., fan shaft 45; see FIG. 1).

Accordingly, given the separate forward and aft planet gears 122, 124 and forward and aft sun gears 112, 114, the epicyclic gearbox assembly 100 may generally be referred to as a "split gear" epicyclic gearbox. It will be appreciated, however, that in other embodiments, the sun gear assembly 106 may instead include, e.g., a single sun gear, and/or the one or more ring gears of the ring gear assembly 110 may include separate forward and aft ring gears.

As will be appreciated, and as will be shown more clearly below with reference to FIG. 4, the epicyclic gearbox assembly 100 further includes a planet gear carrier 128. The planet gear assembly 108 is coupled to the planet gear carrier 128, and more specifically, each of the planet gears 122, 124 of the planet gear assembly 108 are rotatably coupled to the planet gear carrier 128. Accordingly, the planet gear carrier 128 allows each of the planet gears 122, 124 of the planet gear assembly 108 to rotate about its respective local axis 130, while maintaining the planet gears 122, 124 stationary in the circumferential direction C of the epicyclic gearbox assembly 100. Accordingly, it will be appreciated that the gearbox 100 may be referred to as a star gearbox. However, in other embodiments, one of the ring gear assembly 110 or sun gear assembly 106 may instead be held stationary, such that the gearbox 100 is instead configured as/referred to as a planetary gearbox or a differential gearbox, respectively.

Referring still to FIG. 2, in order to allow for the above configuration, the epicyclic gearbox assembly 100 further includes bearings. For example, in the embodiment shown, the epicyclic gearbox assembly 100 includes a forward bearing 132 for the forward planet gear 122 and an aft bearing 134 for the aft planet gear 124. The forward bearing 132 generally includes an inner race 136 containing a plurality of rollers 138. The plurality of rollers 138 of the forward bearing 132 are configured to interface between the forward planet gear 122 and the inner race 136, allowing for relative rotational movement therebetween (i.e., about the local axis 130). Similarly, the aft bearing 134 includes an inner race 140 containing a plurality of rollers 142. The plurality of rollers 142 of the aft bearing 134 are configured to interface between the aft planet gear 124 and the inner race 140, similarly allowing for relative rotational movement therebetween (i.e., about the local axis 130). The inner races 136, 140 of the forward bearing 132 and aft bearing 134, respectively, are positioned on a planet gear member 144 (or planet pin) of the planet gear carrier 128, and more specifically, are press fitted on the planet gear member 144 and retained along the axial direction A through a clamp assembly 146. The clamp assembly 146 generally includes a forward clamp 148 and an aft clamp 150 coupled together using a tie bolt 152.

In such a manner, the forward planet gear 122 and aft planet gear 124 may rotate relative to the planet gear carrier 128 about their local axes 130, while maintaining a stationary position about the circumferential direction C of the epicyclic gearbox assembly 100. (It should be appreciated, however, as stated above, the gearbox 100 may instead be configured as a planetary or differential gearbox, in which the planet gears 122, 124 may rotate about the circumferential direction C of the epicyclic gearbox assembly 100.)

It will further be appreciated that, although not depicted, the epicyclic gearbox assembly 100 further includes a lubrication system for providing lubrication fluid to various components of the epicyclic gearbox assembly 100. For example, the lubrication system is configured to provide lubrication fluid to at least the bearings 132, 134 and planet gears 122, 124 of the planet gear assembly 108. In addition, the exemplary epicyclic gearbox assembly 100 additionally includes features for containing the lubrication fluid provided to certain of these components by the lubrication system during operation of the epicyclic gearbox assembly 100.

For example, for the embodiment depicted, the epicyclic gearbox assembly 100 further includes first, forward lubrication fluid shroud and a second, aft lubrication fluid shroud. The forward and aft lubrication fluid shrouds are configured to contain the lubrication motion within, or around, the planet gear assembly 108 and bearings 132, 134 along the axial direction A. Accordingly, the forward lubrication fluid shroud is referred to herein as a forward axial shroud 154 and the aft lubrication fluid shroud is referred to herein as an aft axial shroud 156. The forward axial shroud 154 is positioned forward of the one or more planet gears of the planet gear assembly 108 (including the forward planet gear 122) along the axial direction A, and the aft axial shroud 156 is positioned aft of the one or more planet gears of the planet gear assembly 108 (including the aft planet gear 124) along the axial direction A.

Further, it will be appreciated that the forward axial shroud 154 defines an inside surface 158 (see FIG. 3) facing the one or more planet gears of the planet gear assembly 108 (including the forward planet gear 122) and, similarly, the aft axial shroud 156 includes an inside surface 160 facing the one or more planet gears of the planet gear assembly 108 (including the aft planet gear 124). More specifically, the forward axial shroud 154 covers substantially all of a forward side of the forward planet gear 122 and the aft axial shroud 156 covers substantially all of an aft side of the aft planet gear 124. Further, the forward axial shroud 154 covers substantially all of the forward bearing 132 and the aft axial shroud 156 covers substantially all of the aft bearing 134. As used herein, the term "covers" with reference to the forward and aft axial shrouds 154, 156 refers to the component overlapping the other component when viewed along the axial direction A of the epicyclic gearbox assembly 100.

In certain embodiments, the aft axial shroud 156 may be configured in substantially the same manner as the forward axial shroud 154 (with, e.g., some minor distinctions allowing for ease of installation). Additionally, it will be appreciated that for the embodiments shown, the portions of forward axial shroud 154 and aft axial shroud 156 covering the forward planet gear 122 and aft planet gear 124, respectively, as well as the forward bearing 132 and aft bearing 134, respectively, extend substantially along the radial direction of the epicyclic gearbox assembly 100.

It will further be appreciated that the forward axial shroud 154 is positioned relatively close to the forward side of the forward planet gear 122 and the aft axial shroud 156 is positioned relatively close to the aft side of the aft planet gear 124. More specifically, for the embodiment shown the forward axial shroud 154 defines an axial separation 162 from the forward planet gear 122 (i.e., a minimum separation between the two components along the axial direction A) that is less than about 0.5 inches, and the aft axial shroud 156 defines an axial separation 164 from the aft planet gear 124 also less than about 0.5 inches. Notably, however, in other embodiments, the axial separations 162, 164 may instead be, e.g., less than about 0.7 inches, such as less than about 0.4 inches, such as less than about 0.3 inches, such as less than about 0.25 inches.

Inclusion of the forward axial shroud 154 and aft axial shroud 156 may assist with containing the lubrication fluid motion along the axial direction A of the epicyclic gearbox assembly 100, such that the lubrication fluid provided to, e.g., the bearings 134, 136 and/or the planet gears 122, 124 during operation generates lower windage losses and is maintained/contained close to the contacting surfaces of such components for a longer period of time, increasing an efficiency and lifespan of the epicyclic gearbox assembly 100, especially in the case of an inadvertent oil flow interruption, e.g. in a "negative g" flight phase. In addition, inclusion of the forward axial shroud 154 and aft axial shroud 156 may also assist with directing the lubrication fluid in a desired manner for collection.

Accordingly, it will further be appreciated that the epicyclic gearbox assembly 100 also includes features for efficiently collecting lubrication fluid previously provided to the various components of the epicyclic gearbox assembly 100, as described above. More specifically, referring now to FIG. 3, providing a close-up view of a portion of the exemplary gearbox assembly 100 of FIG. 2, it will be appreciated that the epicyclic gearbox assembly 100 further includes a lubrication fluid collection assembly 170. The lubrication fluid collection assembly 170 generally includes a rotating oil scoop 172 and a static oil collector 174. The rotating oil scoop 172 extends in the circumferential direction C around the ring gear assembly 110 (see also FIG. 4) and the static oil collector 174 is positioned at least partially outward of the rotating oil scoop 172 along the radial direction R.

As is depicted, the rotating oil scoop 172 is coupled to the ring gear assembly 110 at a location forward of the one or more ring gears of the ring gear assembly 110, or rather, forward of each of the one or more ring gears of the ring gear assembly 110 (which, for the embodiment depicted, is the single ring gear 126). More specifically, the rotating oil scoop 172 is coupled to the ring gear shaft 127 of the ring gear assembly 110 at a location forward of the ring gear 126, and more specifically still, at a joint 176. The rotating oil scoop 172 is supported substantially completely at the joint 176. It will accordingly be appreciated that the rotating oil scoop 172 is fixed to, and configured to rotate with the ring gear assembly 110 (hence a "rotating" oil scoop).

By contrast, the static oil collector 174 is coupled to the planet gear carrier 128. More specifically, the static oil collector 174 includes a flange 178 at an aft end of the static oil collector 174 bolted to the planet gear carrier 128. In such a manner, the static oil collector 174 is supported substantially completely by the planet gear carrier 128, and more specifically is supported substantially completely at the flange 178 by the planet gear carrier 128. Notably, the flange 178 is positioned aft of the one or more ring gears (i.e., the ring gear 126) of the ring gear assembly 110. It will accordingly be appreciated that the static oil collector 174 is fixed to a stationary component of the epicyclic gearbox assembly 100, and therefore is not configured to rotate about the axial direction A (hence a "static" oil collector).

Further, the rotating oil scoop 172 generally includes a forward end 180 coupled to the ring gear shaft 127 at the joint 176 and an aft end 182. As is depicted, for the embodiment shown the forward end 180 of the rotating oil scoop 172 and the joint 176 are each positioned forward of the ring gear 126 and the aft end 182 of the rotating oil scoop 172 is positioned aft of the ring gear 126. Accordingly, it will be appreciated that the rotating oil scoop 172 extends from a location forward of the ring gear 126 to a location aft of the ring gear 126. More specifically, for the embodiment depicted, the rotating oil scoop 172 extend substantially continuously from the forward end 180 positioned forward of the ring gear 126 to the aft end 182 positioned aft of the ring gear 126 (e.g., with no flanges or joints positioned therebetween). More specifically, still, for the embodiment depicted the rotating oil scoop 172 extends from a location forward of the inside surface 158 of the forward axial shroud 154 to a location aft of the inside surface 160 of the aft axial shroud 156.

Figure 3:
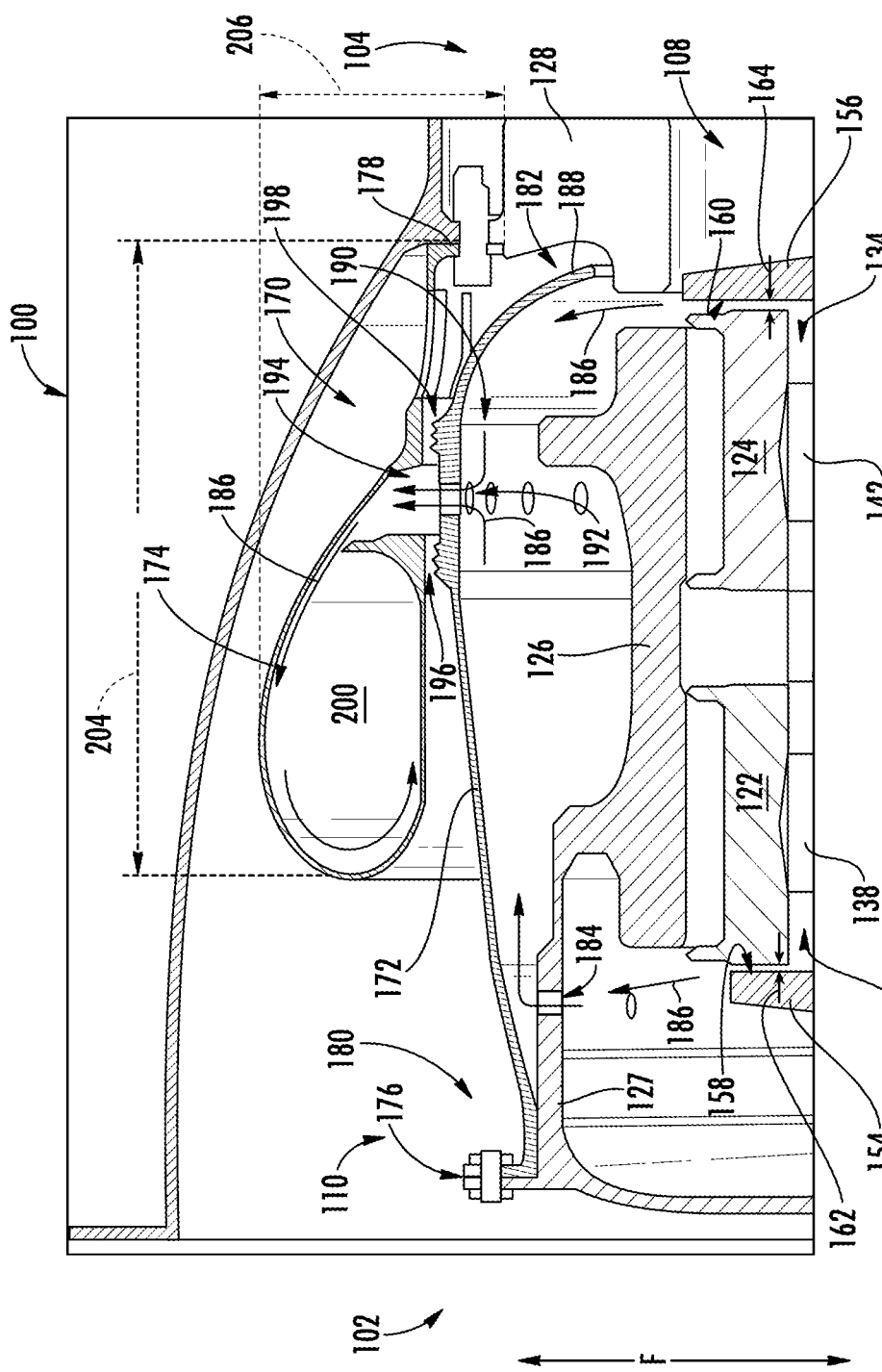
FIG. 3 is a close-up, cross-sectional view of a portion of the exemplary gearbox of FIG. 2.

Moreover, referring still to FIG. 3 the ring gear shaft 127 defines a plurality of lubrication fluid openings 184 spaced along the circumferential direction C. The lubrication fluid openings 184 are positioned forward of the ring gear 126 along the axial direction A and aft of the joint 176 along the axial direction A. However, in other embodiments, the plurality of lubrication fluid openings 184 may be positioned elsewhere or configured in any other suitable manner.

Accordingly, it will be appreciated that during operation of the epicyclic gearbox assembly 100, lubrication fluid may flow (as is indicated by arrows 186) from a location forward of the ring gear 126 (e.g., from between the plurality of planet gears 122, 124 and the forward axial shroud 154) and through the plurality of openings 184 in the ring gear shaft 127 to be collected by the rotating oil scoop 172. Additionally, during operation of the epicyclic gearbox assembly 100, lubrication fluid 186 may also flow from a location aft of the ring gear 126 (e.g., from between the plurality of planet gears 122, 124 and the aft axial shroud 156) and may be collected by the aft end 182 of the rotating oil scoop 172. Notably, the aft end 182 of the rotating oil scoop 172 includes a lip 188 to assist with the collection of such lubrication fluid (the lip 188 extending generally inwardly along the radial direction R).

Moreover, the rotating oil scoop 172 further includes a radially outer-most portion 190. The lubrication fluid collection assembly 170 is configured to transfer lubrication fluid collected by the rotating oil scoop 172 in the radially outer-most portion 190 of the rotating oil scoop 172 to the static oil collector 174. More specifically, the rotating oil scoop 172 defines a plurality of lubrication fluid exits 192 spaced along the circumferential direction C at the radially outer-most portion 190. Each of the plurality of lubrication fluid exits 192 defined by the rotating oil scoop 172 is configured as an opening allowing for a flow of lubrication oil therethrough (again represented by arrows 186).

Briefly, it should be appreciated that during operation of the planet gear assembly 100, the lubrication fluid may be centrifuged outwardly along the radial direction R due to, e.g., a relatively high rotational speed of at least certain components within the epicyclic gearbox assembly 100. Accordingly, in such a manner the lubrication fluid may have a relatively high amount of kinetic energy as it begins to be centrifuged radially outwardly during operation of the epicyclic gearbox assembly 100.

Referring still to FIG. 3, the static oil collector 174, which is located at least partially outward of the rotating oil scoop 172 along the radial direction R, defines an inlet 194. The inlet 194 of the static oil collector 174 is positioned outward of at least one of the lubrication fluid exits 192 of the rotating oil scoop 172 along the radial direction R and aligned with at least one of the lubrication fluid exits 192 of the rotating oil scoop 172 along the axial direction A. Furthermore, the lubrication fluid collection assembly 170 includes a forward seal 196 positioned forward of the lubrication fluid exits 192 of the rotating oil scoop 172 and inlet 194 of the static oil collector 174, as well as an aft seal 198 positioned aft of the lubrication fluid exits 192 of the rotating oil scoop 172 and inlet 194 of the static oil collector 174. In such a manner, lubrication fluid may be transferred from the rotating oil scoop 172 to the static oil collector 174 by transferring such lubrication fluid from the plurality of exits 192 to the inlet 194.

Figure 4:
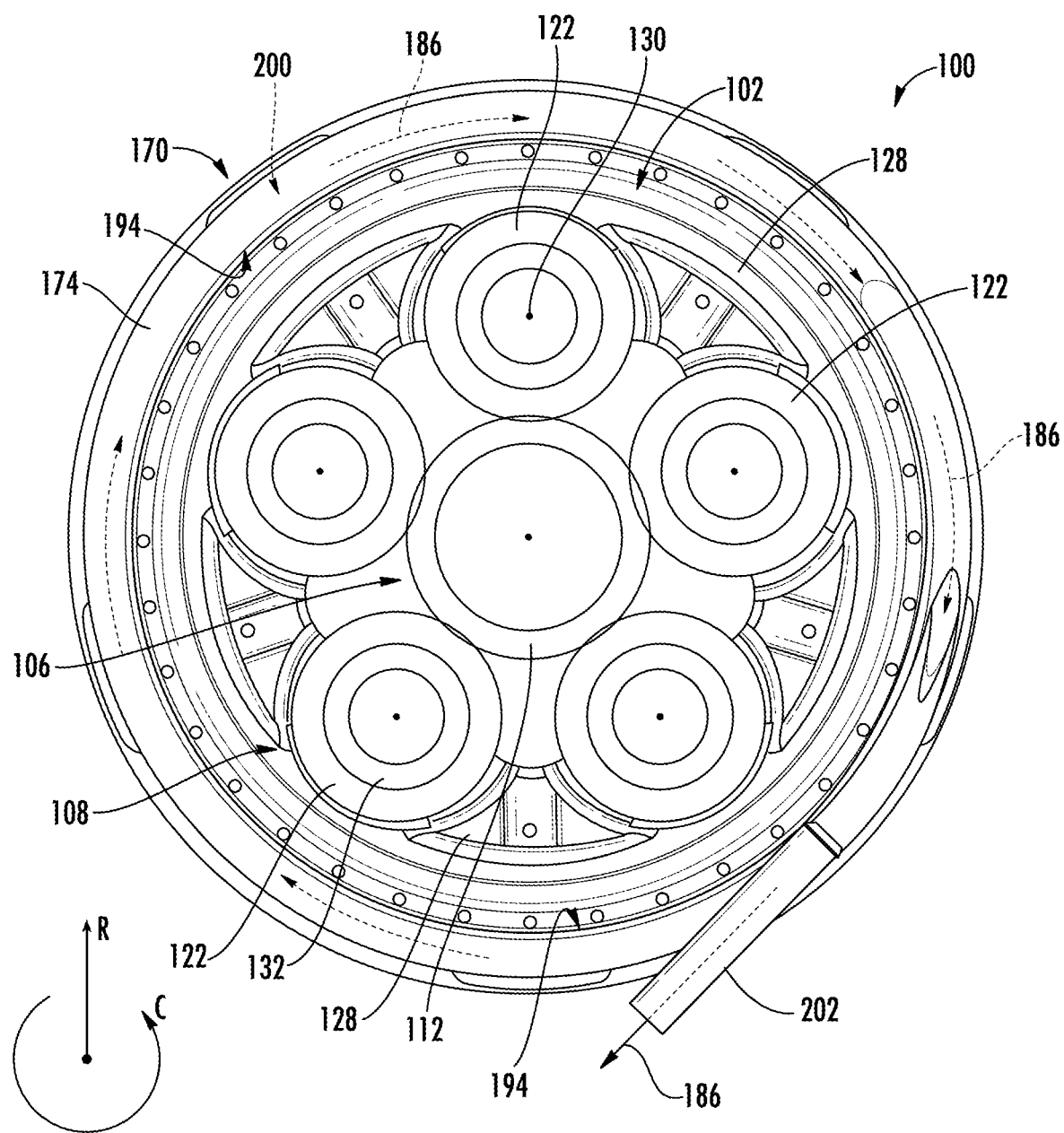
FIG. 4 is a forward, schematic view of a portion of the exemplary gearbox of FIG. 2.

Referring now also to FIG. 4, it will be appreciated that the static oil collector 174 further defines a collection chamber 200 for receiving lubrication fluid from the inlet 194. FIG. 4 provides a schematic, forward end view of the plant gearbox assembly of FIGS. 2 and 3. Notably, the ring gear assembly 110 and rotating oil scoop 172 of the lubrication fluid collection assembly 170 is removed from FIG. 4 for clarity.

As is depicted, the inlet 194 of the static oil collector 174 is configured as a substantially continuous inlet 194 extending along the circumferential direction C. Notably, however, in other embodiments, the static oil collector 174 may instead define a plurality of inlets 194 spaced along the circumferential direction C, with each of these inlets 194 being fluidly connected to the collection chamber 200. For example, with such an embodiment, each of the plurality of inlets 194 may be aligned with at least one lubrication fluid exit 192 along the axial direction A and be positioned radially outward of at least one lubrication fluid exit 192 along the radial direction R. (Of course, however, during operation of the epicyclic gearbox assembly 100, the rotating oil scoop 172 will be rotating relative to the stationary oil collector 174, and accordingly, the individual exit 192 which a given inlet 194 is positioned radially outward of will continuously change.)

As with the embodiment shown including the single inlet 194 extending substantially continuously along the circumferential direction C, the collection chamber 200 also extends substantially continuously along the circumferential direction C. Additionally, the static oil collector 174 includes an exit tube 202 fluidly connected to the collection chamber 200. In such a manner, during operation of the epicyclic gearbox assembly 100, lubrication fluid may flow (as indicated by arrows 186) from the plurality of lubrication fluid exits 192 defined by the rotating oil scoop 172, through the inlet 194 of the static oil collector 174, and into the collection chamber 200 of the static oil collector 174 (see particularly, FIG. 3). More specifically, as is first shown in FIG. 3, the flow of lubrication fluid 186 into the collection chamber 200 may swirl around the collection chamber 200, losing a small amount of kinematic energy while preventing the generation of turbulence in the fluid, hence reducing the risk of foaming of the lubrication fluid. Further, as is shown in FIG. 4, the flow of lubrication fluid 186 within the collection chamber 200 may swirl through the collection chamber 200 in the circumferential direction C, further losing a relatively small amount of kinetic energy within the flow of lubrication fluid 186 and reducing the risk of foaming of the lubrication fluid. The collected lubrication fluid within the collection chamber 200 may then exit through the exit tube 202 of the static oil collector 174, which as is shown is fluidly connected to the collection chamber 200. The exit tube 202 may be fluidly connected to a lubrication fluid sump (not shown) to receive such lubrication fluid, re-pressurize the lubrication fluid, and provide the lubrication fluid back through the lubrication system of the epicyclic gearbox assembly 100.

Notably, by relatively gradually reducing the amount of kinetic energy within the flow of lubrication fluid in the manner described herein, the lubrication fluid may more efficiently be collected and directed to a scavenge port during normal flight phases, as well as during, e.g., "negative g" flight phases. In addition, relatively gradually reducing the amount of kinetic energy within the flow of lubrication fluid may reduce the risk of foaming of the lubrication fluid dramatically (e.g., close to zero).

Moreover, it will be appreciated that the lubrication fluid collection assembly 170 configured in accordance with one or more the embodiments described herein may result in a lubrication fluid collection assembly 170 able to be packaged in a smaller radial envelope. For example, with reference back particularly to FIG. 3 the static oil collector 174 defines an overall length 204 along the axial direction A and a local height 206 along the radial direction R. The overall length 204 of the static oil collector 174 is greater than the local height 206 of the static oil collector 174. Further, by coupling the rotating oil scoop 172 to the ring gear assembly 110 at a location forward of the one or more ring gears 126, the rotating oil scoop 172 may also have a relatively small radial footprint, as no flanges or other attachment means are required at a location axially aligned with, and positioned radially outward of, the ring gear 126.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims. For instance, features illustrated or described as part of one embodiment may be used on another embodiment to yield a still further embodiment.

While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. An epicyclic gearbox assembly for a gas turbine engine, the epicyclic gearbox assembly defining an axial direction, a radial direction, a circumferential direction, a forward end, and an aft end, the epicyclic gearbox assembly comprising:
   a sun gear assembly;
   a planet gear assembly engaged with the sun gear assembly;
   a ring gear assembly comprising one or more ring gears engaged with the planet gear assembly; and
   a lubrication fluid collection assembly comprising a rotating oil scoop extending in the circumferential direction around the ring gear assembly, the rotating oil scoop coupled to the ring gear assembly at a location forward of one or more ring gears of the ring gear assembly;
   wherein the ring gear assembly further comprises a ring gear shaft that defines a plurality of lubrication fluid openings.

2. The epicyclic gearbox assembly of claim 1, wherein the rotating oil scoop is coupled to the ring gear shaft at a location forward of the one or more ring gears.

3. The epicyclic gearbox assembly of claim 2, wherein the rotating oil scoop extends from a location forward of the one or more ring gears to a location aft of the one or more ring gears.

4. The epicyclic gearbox assembly of claim 2, wherein the rotating oil scoop is coupled to the ring gear shaft at a joint, wherein the plurality of lubrication fluid openings defined by the ring gear shaft are spaced along the circumferential direction and positioned aft of the joint along the axial direction.

5. The epicyclic gearbox assembly of claim 4, wherein the plurality of lubrication fluid openings defined by the ring gear shaft are positioned forward of the one or more ring gears along the axial direction.

6. The epicyclic gearbox assembly of claim 4, wherein the rotating oil scoop is supported substantially completely at the joint.

7. The epicyclic gearbox assembly of claim 1, wherein the lubrication fluid collection assembly further comprises a static oil collector positioned at least partially outward of the rotating oil scoop along the radial direction.

8. The epicyclic gearbox assembly of claim 7, wherein the rotating oil scoop defines a plurality of lubrication fluid exits spaced along the circumferential direction, wherein the static oil collector defines an inlet, and wherein the inlet of the static oil collector is positioned outward of at least one of the lubrication fluid exits of the rotating oil scoop along the radial direction and aligned with at least one of the lubrication fluid exits of the rotating oil scoop along the axial direction.

9. The epicyclic gearbox assembly of claim 8, wherein the inlet of the static oil collector is a substantially continuous inlet along the circumferential direction.

10. The epicyclic gearbox assembly of claim 7, wherein the static oil collector defines an inlet for receiving lubrication fluid from the rotating oil scoop and a collection chamber for receiving lubrication fluid from the inlet, wherein the collection chamber extends substantially continuously along the circumferential direction.

11. The epicyclic gearbox assembly of claim 10, wherein the static oil collector comprises an exit tube fluidly connected to the collection chamber.

12. The epicyclic gearbox assembly of claim 7, further comprising:
   a planet gear carrier, wherein the planet gear assembly is coupled to the planet gear carrier, and wherein the static oil collector is also coupled to the planet gear carrier.

13. The epicyclic gearbox assembly of claim 12, wherein the static oil collector is supported substantially completely by the planet gear carrier.

14. The epicyclic gearbox assembly of claim 7, wherein the static oil collector defines an overall length along the axial direction and a local height along the radial direction, wherein the overall length of the static oil collector is greater than the local height of the static oil collector.

15. The epicyclic gearbox assembly of claim 1, wherein the planet gear assembly comprises one or more planet gears, and wherein the epicyclic gearbox assembly further comprises:
   a forward lubrication fluid shroud positioned forward of the one or more planet gears of the planet gear assembly for containing lubrication fluid; and
   an aft lubrication fluid shroud positioned aft of the one or more planet gears of the planet gear assembly for containing lubrication fluid.

16. The epicyclic gearbox assembly of claim 15, wherein the forward lubrication fluid shroud defines an inside surface facing the one or more planet gears, wherein the aft lubrication fluid shroud defines an inside surface facing the one or more planet gears, wherein the rotating oil scoop extends from a location forward of the inside surface of the forward lubrication fluid shroud to a location aft of the inside surface of the aft lubrication fluid shroud.

17. The epicyclic gearbox assembly of claim 1, wherein the rotating oil scoop extends substantially continuously from a forward end to an aft end.

18. A gas turbine engine defining an axial direction, a radial direction, and a circumferential direction, the gas turbine engine comprising:
   a turbine section comprising a turbine;
   a fan assembly comprising a fan; and
   an epicyclic gearbox assembly coupling the turbine of the turbine section to the fan of the fan assembly, the epicyclic gearbox defining a forward end and an aft end and comprising
   a sun gear assembly;
   a planet gear assembly engaged with the sun gear assembly;
   a ring gear assembly comprising one or more ring gears engaged with the planet gear assembly; and
   a lubrication fluid collection assembly comprising a rotating oil scoop extending in the circumferential direction around the ring gear assembly, the rotating oil scoop coupled to the ring gear assembly at a location forward of one or more ring gears of the ring gear assembly;

wherein the ring gear assembly further comprises a ring gear shaft that defines a plurality of lubrication fluid openings.

19. The gas turbine engine of claim 18, wherein the rotating oil scoop is coupled to the ring gear shaft at a location forward of the one or more ring gears.

20. The gas turbine engine of claim 19, wherein the rotating oil scoop is coupled to the ring gear shaft at a joint, wherein the plurality of lubrication fluid openings defined by the ring gear shaft are spaced along the circumferential direction and positioned aft of the joint along the axial direction, and wherein the rotating oil scoop is supported substantially completely at the joint.

* * * * *